United States Patent
Ghosh et al.

(10) Patent No.: US 8,553,712 B2
(45) Date of Patent: Oct. 8, 2013

(54) CARRIER MANAGEMENT IN A WIRELESS COMMUNICATION DEVICE ASSIGNED A SET OF TWO OR MORE CARRIERS BY A WIRELESS COMMUNICATION NETWORK

(75) Inventors: Donna Ghosh, San Diego, CA (US); Qingxin Chen, Del Mar, CA (US); Christopher Gerard Lott, San Diego, CA (US); Jun Hu, San Diego, CA (US); Ravindra Garach, San Diego, CA (US); Rashid Ahmed Akbar Attar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 737 days.

(21) Appl. No.: 12/362,440

(22) Filed: Jan. 29, 2009

(65) Prior Publication Data

US 2009/0196196 A1    Aug. 6, 2009

Related U.S. Application Data

(60) Provisional application No. 61/025,696, filed on Feb. 1, 2008.

(51) Int. Cl.
*G01R 31/08* (2006.01)
*H04W 4/00* (2009.01)
*H04J 3/17* (2006.01)

(52) U.S. Cl.
USPC ............................ 370/433; 370/252; 370/329

(58) Field of Classification Search
USPC ....................................................... 370/433
See application file for complete search history.

(56) References Cited

U.S. PATENT DOCUMENTS 5,781,540 A * 7/1998 Malcolm et al. ............... 370/321
5,903,848 A * 5/1999 Takahashi ..................... 455/512

(Continued)

FOREIGN PATENT DOCUMENTS

CN    1894864 A    1/2007
GB    2415871       1/2006

(Continued)

OTHER PUBLICATIONS

3rd Generation Partnership Project 2 3GPP2: "3GPP2 C.S0024-B Version 2.0 cdma2000 High Rate Packet Data Air Interference Specification cdma2000 High Rate Packet Data Air Interference Specification cdma2000 High Rate Packet Data Air Interference Specification" 3GPP2 C.S0024-B, Version 2.0, Mar. 1, 2007, pp. 1-1627.

(Continued)

*Primary Examiner* — Jutai Kao
(74) *Attorney, Agent, or Firm* — Eric Ho

(57) ABSTRACT

Carrier management in a wireless communication device assigned a set of two or more carriers by a wireless communication network is disclosed. In one aspect, a method of carrier management includes transmitting data over the wireless communication network on one or more carriers forming a subset of active carriers from the set of carriers assigned to the wireless communication device. A first performance metric is determined indicative of operating conditions across the set of carriers assigned to the wireless communication device. A desired number of carriers on which to transmit data based on the first performance metric is determined. The desired number of carriers on which to transmit data is compared with the number of carriers in the subset of active carriers. The subset of active carriers is dynamically adjusted based on the comparison and subsequent data is transmitted over the wireless communication network using the adjusted subset of active carriers.

80 Claims, 7 Drawing Sheets

(56) References Cited

U.S. PATENT DOCUMENTS

| | | | |
|---|---|---|---|
| 7,388,923 B2* | 6/2008 | Fukuta et al. | 375/260 |
| 2004/0081076 A1* | 4/2004 | Goldstein et al. | 370/208 |
| 2004/0179547 A1* | 9/2004 | Kuffner et al. | 370/465 |
| 2004/0184461 A1* | 9/2004 | Forssell et al. | 370/395.2 |
| 2004/0228283 A1* | 11/2004 | Naguib et al. | 370/252 |
| 2005/0031047 A1* | 2/2005 | Maltsev et al. | 375/260 |
| 2006/0094372 A1* | 5/2006 | Ahn et al. | 455/67.13 |
| 2009/0238065 A1* | 9/2009 | Dapper et al. | 370/208 |

FOREIGN PATENT DOCUMENTS

| | | |
|---|---|---|
| JP | 1127231 A | 5/1989 |
| WO | WO9824258 | 6/1998 |
| WO | WO02058300 A1 | 7/2002 |
| WO | WO2006096789 A1 | 9/2006 |

OTHER PUBLICATIONS

International Search Report and Written Opinion, PCT/US2009/032750, International Searching Authority, European Patent Office, Jul. 9, 2009.

TIA/EIA/IS-856-A, cdma2000 High Rate Packet Data Air Interface Specification, (Revision of TIA/EIA/IS-856), Apr. 2004.

cdma2000 High Rate Packet Data Air Interface Specification, 3GPP2 C.S0024-B, 3GPP2, Apr. 2006, Version 1.0, Chapter 10.7.6.1.5, Chapter 10.8.6.1.5, URL http://www.3gpp2.org/Public_html/specs/C.S0024-B_v1.0_071012.pdf.

* cited by examiner

CARRIER MANAGEMENT IN A WIRELESS COMMUNICATION DEVICE ASSIGNED A SET OF TWO OR MORE CARRIERS BY A WIRELESS COMMUNICATION NETWORK

CLAIM OF PRIORITY UNDER 35 U.S.C. §119

The present Application for Patent claims priority to Provisional Application No. 61/025,696 entitled "METHOD AND APPARATUS FOR UPLINK CARRIER MANAGEMENT AT THE ACCESS TERMINAL IN MULTICARRIER COMMUNICATION SYSTEMS" filed Feb. 1, 2008, and assigned to the assignee hereof and hereby expressly incorporated by reference herein.

FIELD OF DISCLOSURE

The present disclosure relates generally to circuits, and more specifically to techniques, systems, and methods for carrier management in wireless communication and other applications.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

MIMO systems employ multiple (NT) transmit antennas and multiple (NR) receive antennas for data transmission. A MIMO channel formed by the NT transmit and NR receive antennas may be decomposed into NS independent channels, which are also referred to as spatial channels or carriers. Each of the NS independent channels corresponds to a dimension. These multicarrier systems can provide improved performance if the additional dimensionalities created by the multiple transmit and receive antennas are utilized. For example, each device can be provided with two or more carrier frequencies on which to transmit information, which can lead to higher throughput and/or greater reliability.

Such multicarrier systems, however, present significant technical challenges beyond their single carrier predecessors. One such challenge is managing the number of carriers used to transmit data. In general, using more carriers leads to better performance, e.g., a higher throughput. However, there is a limited amount of transmit power and each carrier has its own power requirements based on overhead and channel characteristics. It may be more efficient to only transmit on a subset of the carriers, or in some instances to drop assigned carriers when their overhead requirements become too burdensome. Accordingly, managing multiple carriers is not a simple extension of single carrier concepts to a multicarrier system.

SUMMARY

Exemplary embodiments of the invention are directed to systems and methods for efficient carrier management.

One embodiment is directed to a method for carrier management in a wireless communication device assigned a set of two or more carriers by a wireless communication network. In this embodiment, the method comprises: transmitting data over the wireless communication network on one or more carriers forming a subset of active carriers from the set of carriers assigned to the wireless communication device; determining a first performance metric indicative of operating conditions across the set of carriers assigned to the wireless communication device; determining a desired number of carriers on which to transmit data based on the first performance metric; comparing the desired number of carriers on which to transmit data with the number of carriers in the subset of active carriers; dynamically adjusting the subset of active carriers based on the comparison; and transmitting subsequent data over the wireless communication network using the adjusted subset of active carriers.

Another embodiment is directed to a wireless communication device for communicating with a wireless communication network over an assigned set of two or more carriers. In this embodiment, the wireless communication device comprises: logic configured to transmit data over the wireless communication network on one or more carriers forming a subset of active carriers from the set of carriers assigned to the wireless communication device; logic configured to determine a first performance metric indicative of operating conditions across the set of carriers assigned to the wireless communication device; logic configured to determine a desired number of carriers on which to transmit data based on the first performance metric; logic configured to compare the desired number of carriers on which to transmit data with the number of carriers in the subset of active carriers; logic configured to dynamically adjust the subset of active carriers based on the comparison; and logic configured to transmit subsequent data over the wireless communication network using the adjusted subset of active carriers.

Another embodiment is directed to a wireless communication device for communicating with a wireless communication network over an assigned set of two or more carriers. In this embodiment, the wireless communication device comprises: means for transmitting data over the wireless communication network on one or more carriers forming a subset of active carriers from the set of carriers assigned to the wireless communication device; means for determining a first performance metric indicative of operating conditions across the set of carriers assigned to the wireless communication device; means for determining a desired number of carriers on which to transmit data based on the first performance metric; means for comparing the desired number of carriers on which to transmit data with the number of carriers in the subset of active carriers; means for dynamically adjusting the subset of active carriers based on the comparison; and means for transmitting subsequent data over the wireless communication network using the adjusted subset of active carriers.

Another embodiment is directed to a computer readable medium comprising code, which, when executed by a processor, causes the processor to perform operations for carrier management in a wireless communication device assigned a set of two or more carriers by a wireless communication network. In this embodiment, the computer readable medium comprises: code for transmitting data over the wireless communication network on one or more carriers forming a subset of active carriers from the set of carriers assigned to the wireless communication device; code for determining a first performance metric indicative of operating conditions across the set of carriers assigned to the wireless communication device; code for determining a desired number of carriers on which to transmit data based on the first performance metric; code for comparing the desired number of carriers on which to transmit data with the number of carriers in the subset of active carriers; code for dynamically adjusting the subset of active carriers based on the comparison; and code for transmitting subsequent data over the wireless communication network using the adjusted subset of active carriers.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
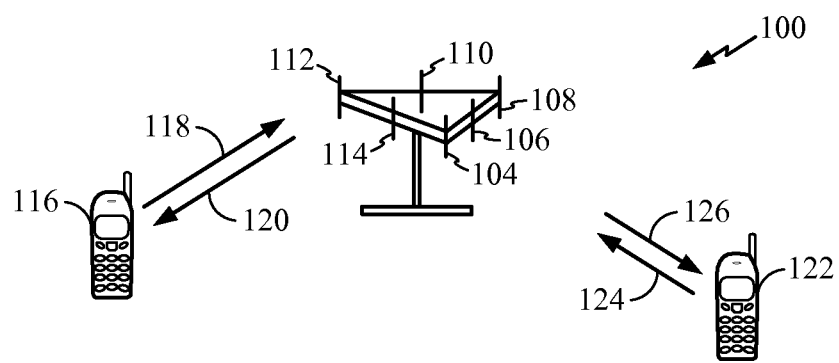
FIG. 1 illustrates a multiple access wireless communication system according to one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

One other exemplary telecommunications standard for the wireless transmission of data through radio signals that provides an illustrative platform for the following descriptions is an Evolution-Data Optimized or Evolution-Data system (which is often abbreviated as EV-DO, EVDO or EV). EV-DO utilizes multiplexing techniques (e.g., CDMA and FDD) to maximize the amount of data transmitted. EV-DO is standardized by 3rd Generation Partnership Project 2 (3GPP2) as part of the CDMA2000 family of standards. EV-DO has been adopted by many mobile phone service providers worldwide particularly those previously employing CDMA networks. There are different revisions or versions of EV-DO. For example, there is EV-DO Revision 0, Revision A and Revision B. For clarity, certain aspects of the techniques are described below for EV-DO, and EV-DO terminology is used in much of the description below. It will be appreciated that the methods and apparatuses described herein in the context of a wireless communication system utilizing EV-DO—Revision B are for illustration purposes only. Such descriptions are not intended to limit various embodiments of the invention to that particular scheme, as the mechanisms, techniques, methods and apparatuses are equally applicable to any other wireless communication system that implements telecommunications standards which utilize multiple carriers.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As discussed in the background, mobile devices have a finite amount of transmit power available for uplink data and overhead transmissions. In multicarrier systems, it is generally desirable to use more carriers to achieve better performance (e.g., a higher throughput). However, there is a limited amount of transmit power and each carrier has its own power requirements based on overhead and channel characteristics, making it more efficient in some cases to transmit on a fewer number of carriers or even to drop carriers assigned to the mobile station when power is limited. Accordingly, embodiments of the invention detailed below provide mechanisms, techniques, methods and apparatuses for efficiently managing the number of carriers assigned to a mobile station and the subset of those carriers used for data transmissions.

FIG. 1 illustrates a multiple access wireless communication system according to one embodiment of the invention.

As shown, an access point (AP) 100 as part a broader access network (AN) (not shown) includes multiple antenna groups, one including 104 and 106, another including 108 and 110, and an additional one including 112 and 114. In FIG. 1, only two antennas are shown for each antenna group, however, more or fewer antennas may be utilized for each antenna group. An access terminal (AT) 116 is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from AT 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the AP. In the embodiment of FIG. 1, the different antenna groups are each designed to communicate with ATs in a given sector covered by AP 100.

In communication over forward links 120 and 126, the transmitting antennas of AP 100 may utilize beamforming in order to improve the signal-to-noise ratio (SNR) of forward links for the different ATs 116 and 124. In general, an AP using beamforming to transmit to ATs scattered randomly through its coverage causes less interference to ATs in neighboring cells than an AP transmitting through a single antenna to all its ATs.

An AP is generally a fixed station used for communicating with the other terminals and may also be referred to as a base station, a Node B, or some other terminology. An AT may also be referred to as a mobile station, user equipment (UE), a wireless communication device, a terminal, or some other terminology.

Overhead channel configuration for uplink and downlink carriers is communicated between the AN (not shown) and the ATs 116, 122 via the AP 100 using assignment messages (e.g., a traffic channel assignment (TCA) message in an IS-856 type system, or a radio bearer reconfiguration message in a W-CDMA type system).

Referring back to FIG. 1, each reverse link carrier assigned to the ATs 116, 122 has a pilot signal associated therewith. The AP 100 can independently control each pilot signal's power level by sending a series of reverse power control (RPC) commands (e.g., up, down, hold) on the associated forward links to the corresponding AT 116, 122. The AT 116, 122 tries to follow the RPC commands to keep the pilot signals reliable, otherwise the channels will not be properly decoded by the AP 100. Further, it is typically desirable to control the overall interference from the multiple ATs 116, 122 in each sector or each cell by use of the RPC commands because as interference increases, the edge users (i.e., those furthest away from the AP 100) may run out of available transmit power and no longer be able to follow RPC commands issued by the AP 100. In this case, the edge users can no longer participate in communication with the AP 100 and the cell size effectively shrinks, thereby limiting the number of users the cell can serve, wasting resources, etc. Although such edge users may be assigned a given number of carriers on which t transmit data, it may not be practical to use or even retain all of the assigned carriers due to their transmit power limitations.

Figure 2:
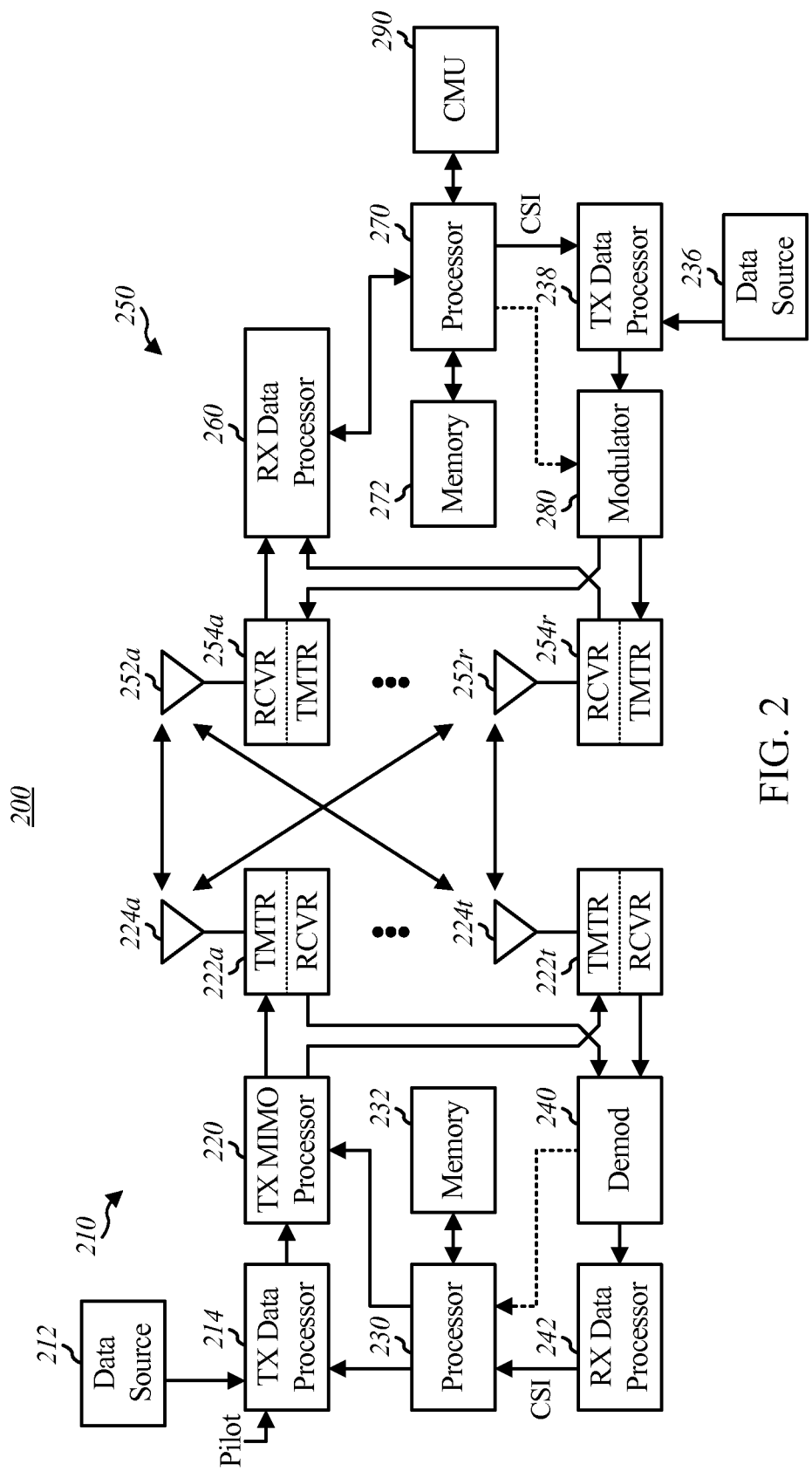
FIG. 2 is a block diagram design of an access point transmitter system and an access terminal receiver system in a MIMO system.

FIG. 2 is a block diagram design of an AP transmitter system 210 and an AT receiver system 250 in a MIMO system 200.

At the AP 210, traffic data for a number of data streams is provided from a data source 212 to a transmit (TX) data processor 214. According to one or more embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques in some embodiments. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222$a$ through 222$t$. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222$a$ through 222$t$ are then transmitted from NT antennas 224$a$ through 224$t$, respectively.

At receiver system 250, the transmitted modulated signals are received by NR antennas 252$a$ through 252$r$ and the received signal from each antenna 252 is provided to a respective receiver (RCVR) 254$a$ through 254$r$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at AP 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to AP 210.

At AP 210, the modulated signals from AT 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

As discussed above with reference to FIG. 1, pilot signal strengths are continuously monitored and adjusted throughout a call based on changing channel conditions. The reverse link transmission power is controlled by two power control loops, an open loop and a closed loop. The open loop generates an estimate of the reverse link quality metric, (e.g., a path loss). The estimated path loss is then translated into a required transmit power (TxOpenLoopPwr) in accordance with other factors, such as loading at the AP 210. The function of the closed loop is to correct the open loop estimate, which does not take into account environmentally induced phenomena, such as shadowing, and other user interference, to achieve a desired signal quality (e.g., signal-to-noise ratio (SNR), controlled dynamically using an outer loop with a performance criterion such as maintaining target PER in the traffic channel) at the AP 210. The objective can be achieved by measuring the quality metric of the reverse link and reporting the results of the measurement back to the AT 250. For example, the AP 210 can measure a reference signal (e.g., a pilot SNR) transmitted over the reverse link, and provide feedback (e.g., RPC commands) to the AT 250, which determines the required closed loop transmit power adjustment (TxClosedLoopAdj). Both open loop and closed loop power control are well known in the art, as is outer loop power control, and so a further description here will be omitted.

If the AT 250 experiences channel deterioration, such as by moving further away from the AP 210 or receiving increased interference, the power control loops operate in concert to generally increase the transmission power on the affected carriers. While the increased transmission aids signal reliability for each channel, given the finite transmit power of the AT 250 it is not possible to increase the transmission power of each carrier indefinitely. In this case, the AT 250 may not be able to use or support all of its assigned carriers. In the other direction, if the AT 250 experiences improved channel conditions, such as by moving closer to the AP 210 or receiving less interference, the power control loops operate in concert to lower the transmission power on each carrier. In this case, the AT 250 may be able to use or support additional carriers.

Accordingly, the AT 250 partitions the set of carriers assigned to it by the AN into a data-active subset of active carriers available for data transmission at any given time and a data-inactive subset of inactive carriers not currently available for data transmission. To manage the carriers, the AT 250 includes a Carrier Management Unit (CMU) 290 that is configured according to various embodiments of the invention to do one or more of the following: (1) dynamically determine the number of assigned uplink carriers on which the AT 250 can efficiently transmit data using its limited transmit power; (2) funnel uplink data transmissions to only a subset of the assigned uplink carriers while continuing overhead channel transmissions in all of the assigned uplink carriers; (3) dynamically determine the number of uplink carriers that the AT 250 can efficiently maintain using its limited available transmit power; and (4) generate appropriate carrier add/drop requests for the AN based on the number of currently assigned uplink carriers. Furthermore, the CMU 290 can be configured to ensure relatively seamless carrier activate/deactivate and add/drop procedures so that ongoing packet transmissions are not interrupted. In other embodiments, the above functions of the CMU 290 are performed in software by the processor 270. Each of the above functions will be described in detail below.

Data Funneling

In a multicarrier system, data is broken into smaller pieces (e.g., packets) and transmitted across the multiple assigned carriers. As transmit power demands increase, carriers may simply be dropped to conserve power. However, in some cases it may be desirable to consolidate data transmission on fewer carriers without actually dropping one or more assigned carriers. This is known as data funneling. This allows the AT to continue receiving data on multiple forward links from the AP over a larger coverage area without having to drop carriers due to reverse link transmit power limitations.

Figure 3:
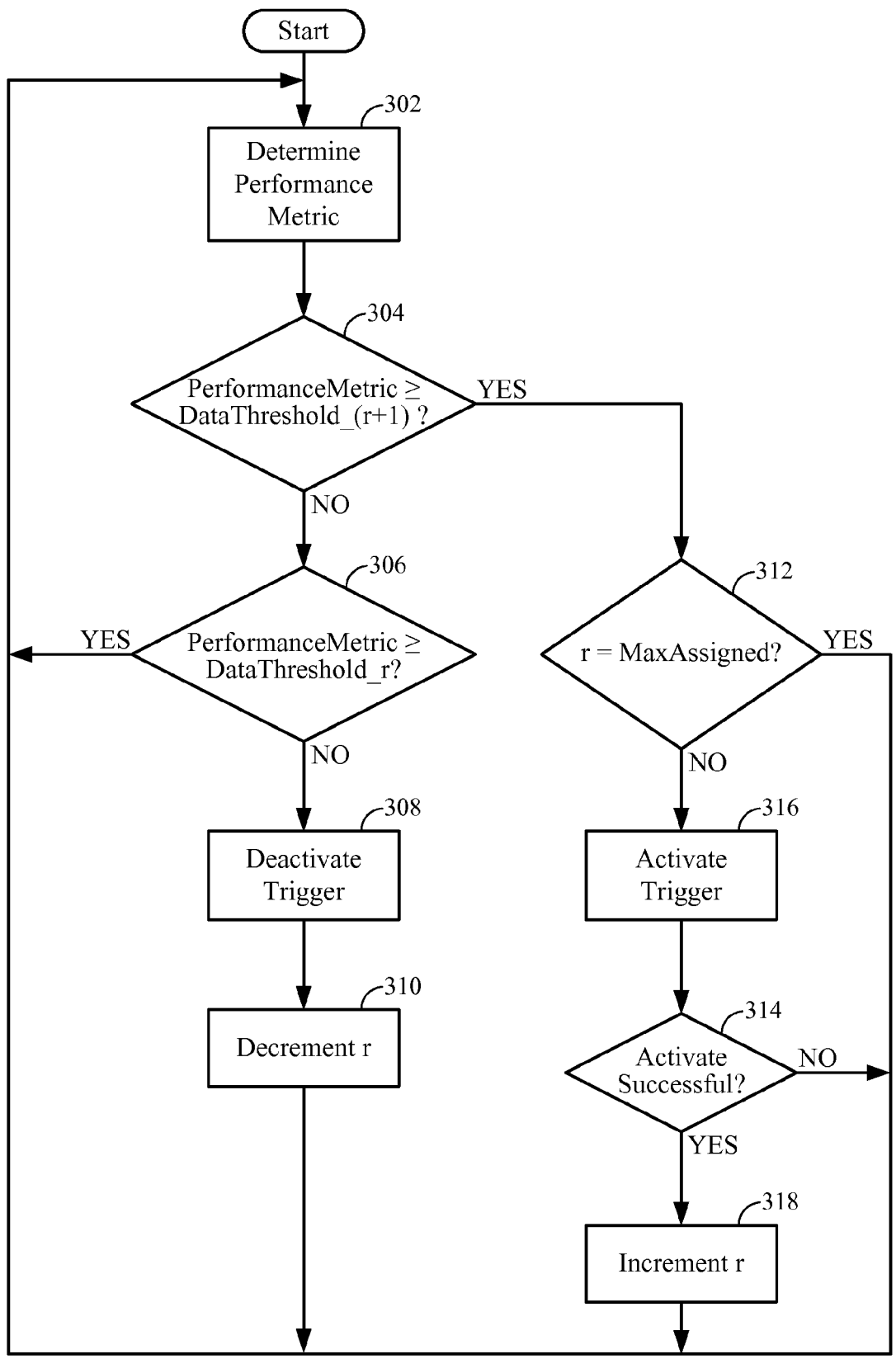
FIG. 3 is a flow diagram that illustrates dynamically determining at an AT the number of uplink carriers on which to transmit data according to an embodiment of the invention.

FIG. 3 is a flow diagram that illustrates dynamically determining at an AT the number of uplink carriers on which to transmit data according to an embodiment of the invention.

As shown, the AT of FIG. 3 (e.g., AT 250) determines an overall PerformanceMetric for the AT's transmission based on the conditions in each carrier (block 302). For example, the PerformanceMetric can be a metric indicating the long term average interference seen by the AT over all carriers. In one embodiment, the PerformanceMetric is a function of the average transmit pilot power. Alternatively, the PerformanceMetric can be a metric indicating the total available data at the AT. In one embodiment, the PerformanceMetric is the average data queue length summed over all active media access control (MAC) flows at a given time. As another alternative, the PerformanceMetric can be a metric based on minimum data rate requirements for each carrier when it may be desirable to funnel data to fewer higher data rate carriers rather than spread data transmission over several lower data rate carriers. In one embodiment, the PeformanceMetric is the aggregate of the average transmit traffic to pilot transmit power ratios (TxT2P) for current data transmission across all of the assigned carriers.

Here, the number of uplink carriers r to be used for data transmission is determined according to a set of data funneling thresholds DataThreshold_r (i.e., DataThreshold_1, DataThreshold_2, ..., DataThreshold_MaxAllowed, where MaxAllowed is the maximum number of carriers supportable in a given system). The PerformanceMetric must meet or exceed a particular DataThreshold_r to use r number of carriers for data transmission. For example, if the PerformanceMetric is located between the second and third thresholds (i.e., DataThreshold_2<PerformanceMetric≤DataThreshold_3), the AT determines that it can handle two carriers for data transmission. Each threshold can be set so that the available transmit power is used efficiently for that number of carriers. The power efficiency of each configuration can be measured, for example, in terms of the energy per bit over the interference power spectral density (Eb/Nt) of each active channel. Eb/Nt represents the effective cost for transmitting one bit with a certain packet error rate and so provides a good measure of efficiency. In one embodiment where the PerformanceMetric is based on the average transmit pilot power, DataThreshold_r is the minimum average transmit pilot power required to transmit data on r number of active carriers at a specified minimum data rate. In another embodiment where the PerformanceMetric is based on the total available data at the AT, DataThreshold_r is the minimum amount of data needed to keep r number of carriers active. In another embodiment where the PerformanceMetric is based on minimum data rate requirements, DataThreshold_r is the total TxT2P required to transmit data on r number of active carriers at their determined minimum data rates. As an example, the DataThreshold_1 could be set using a minimum data rate of 19.6 kbps in the reverse link carrier. In another embodiment, DataThreshold_1 could be set using a minimum data rate of 38.4 kbps in the reverse link carrier. In this embodiment, more than one reverse link carrier is supported for active data transmissions at the AT only if the AT can sustain at least 19.6 kbps in one carrier, or in the second example, 38.4 kbps in one carrier. DataThreshold_2 could then be set using a minimum data rate of 19.6 kbps. Further, the AT can support two reverse link carriers for active data transmissions if it can sustain at least 38.4 kbps or 19.6 kbps in one carrier, and 19.6 kbps in the second carrier.

Referring back to FIG. 3, based on the number of carriers r in active use, the PerformanceMetric is compared to the next threshold DataThreshold_(r+1) to determine if more carriers can be efficiently used for data transmission (block 304). For example, on startup the number of carriers currently in use for data transmissions is zero and the procedure begins by looking at DataThreshold_1. In this case, when the PerformanceMetric is less than DataThreshold_1, the AT is simply not able to transmit any data at that time because of prohibitive channel interference, being very far from the AP, etc.

If the PerformanceMetric does not meet or exceed DataThreshold_(r+1), the PerformanceMetric is compared to the current DataThreshold_r to determine if the AT can still efficiently support data transmission on the current number of active carriers r (block 306). If the PerformanceMetric is greater than or equal to DataThreshold_r (i.e., DataThreshold_r<PerformanceMetric≤DataThreshold_(r+1)), the number of carriers r in use for data transmission is already set to the desired number and no further action is needed. If the PerformanceMetric is less than DataThreshold_r, the number of carriers r in use for data transmission can in fact no longer be simultaneously used in an efficient manner. Here, a deactivate signal is triggered to remove one carrier from the data-active subset used for data transmission (block 308). The removed carrier is placed into the data-inactive subset. The number active carriers r is decremented to reflect the change in active carrier status (block 310).

Returning to the comparison of the PerformanceMetric and DataThreshold_(r+1), if the PerformanceMetric meets or exceeds DataThreshold_(r+1), the AT determines that it can efficiently support another carrier for data transmission. Here, the AT first checks to make sure that it has not already reached the maximum supportable number of carriers defined by the current communication system (block 312). If it has in fact reached the limit on the number of carriers the AT can use, no further action is taken. Otherwise, an activate signal is triggered to attempt to add another carrier to the data-active subset for subsequent data transmissions (block 314). The AT then checks to see if its attempt to add another carrier to the data-active subset was successful (block 316). If the activation was not successful, no further action is taken. For example, if the AT is transmitting on every assigned carrier with no inactive carriers available to promote to the data-active subset and no additional carriers can be provided by the AN at that time, the attempt to add another carrier will be unsuccessful. (Carrier add/drop requests to the AN are discussed below.) If the activation was successful, the number of active carriers r is incremented to reflect the change in active carrier status (block 318).

While the number of desired carriers in the data-active and data-inactive subsets can be adjusted as described above, the particular carrier chosen to be activated or deactivated is determined separately. In one embodiment, the particular carrier chosen to be activated or deactivated is determined according to carrier priorities. For example, in an EV-DO system, carrier priority is indicated in the ReverseChannelDroppingRank attribute defined in the 3GPP2 standard, 3GPP2 C.S0024-B (IS-865A air interface). When there is a tie among carriers based on the ReverseChannelDropping Rank metric, the AT uses a second metric as a tie-breaker. Some example secondary metrics that can be used include the transmit pilot power, FRAB, T2PInflow, etc., each of which is an RTCMAC-RevB state variable defined in the 3GPP2 1xEV-DO RevB standards text. These metrics favor the more efficient uplink carriers. As an example, dropping the carrier with the largest average transmit power implies that the AT is dropping the carrier with the highest interference. Hence the AT is able to sustain spectrally efficient transmissions by dropping carriers with higher interference levels. However, it is often desirable to filter these metrics over a long-term average to smooth out transient noise. Tracking long-term channel efficiency as opposed to instantaneous noise provides more stable operation with less oscillation. Example filtering methods include a moving window average with a time constant of a desired length, infinite impulse response (IIR) filtering, or any other well-known filtering method. Relatively heavy filtering (e.g., a window on the order of a few seconds) can allow tracking of even relatively slowly fading channels.

Data funneling according to various embodiments of the invention detailed above uses the available transmit power more efficiently (e.g., Eb/Nt efficiency). Data funneling also avoids excessive fragmentation of packets at the physical layer, which can lead to higher overhead and application layer packet error-rates (PER).

Carrier Add/Drop

As noted above, occasionally the AT determines that it can efficiently transmit data on a number of carriers exceeding the amount assigned to it by the AN. On the other hand, occasionally the number of carriers made inactive becomes too burdensome for the AT to maintain their overhead and pilot channel transmissions.

Figure 4:
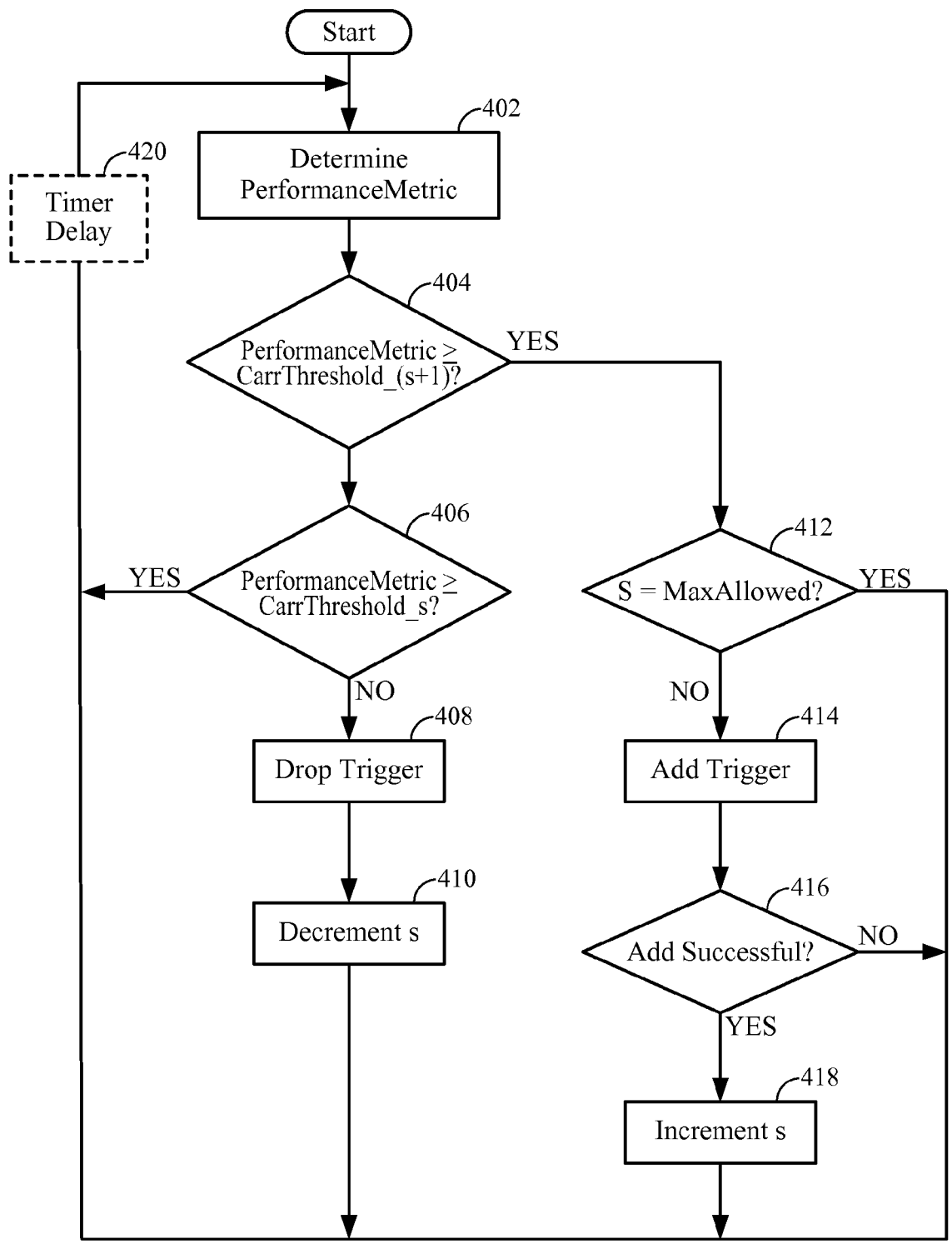
FIG. 4 is a flow diagram that illustrates dynamically determining at an AT the number of uplink carriers that can be efficiently maintained according to an embodiment of the invention.

FIG. 4 is a flow diagram that illustrates dynamically determining at an AT the number of uplink carriers that can be efficiently maintained according to an embodiment of the invention.

As shown, the AT of FIG. 4 (e.g., AT 250) once again determines the overall PerformanceMetric for the AT's transmissions based on the conditions in each carrier (block 402).

The PerformanceMetric can be any of the metrics described above in conjunction with FIG. 3. Furthermore, the PerformanceMetric of FIG. 4 can be the same or different from the PerformanceMetric of FIG. 3.

Here, the number of uplink carriers s that the AT can efficiently maintain at any given time is determined according to a set of carrier thresholds CarrThreshold_s (i.e., CarrThreshold_1, CarrThreshold_2, ..., CarrThreshold_MaxAllowed, where MaxAllowed is again the maximum number of carriers supportable in a given system). The PerformanceMetric must meet or exceed a particular CarrThreshold_s to sustain that number of carriers at the AT. For example, if the PerformanceMetric is located between the second and third thresholds (i.e., CarrThreshold_2<PerformanceMetric≤CarrThreshold_3), the AT determines that it can sustain two carriers and maintain each of their overhead and pilot channels. Each threshold can be set so that the available transmit power is not spread over too many overhead and pilot channels for inactive carriers. In one embodiment where the PerformanceMetric is based on the average transmit pilot power, CarrThreshold_r is the minimum average transmit pilot power required to sustain r number of carriers. In another embodiment where the PerformanceMetric is based on the total available data at the AT, CarrThreshold_r is the minimum amount of data needed to keep r number of carriers assigned to the AT. In another embodiment where the PerformanceMetric is based on minimum data rate requirements, CarrThreshold_r is the total TxT2P required to sustain r number of carriers at their determined minimum data rates. As an example, the CarrThreshold_1 could be set using a minimum data rate of 19.6 kbps in the reverse link carrier. In another embodiment, CarrThreshold_1 could be set using a minimum data rate of 38.4 kbps in the reverse link carrier. In this embodiment, more than one reverse link carrier is supported at the AT only if the AT can sustain at least 19.6 kbps in one carrier, or in the second example, 38.4 kbps in one carrier. CarrThreshold_2 could then be set using minimum data rate of 9.6 kbps. Further, the AT can support two reverse link carriers if it can sustain at least 38.4 kbps or 19.6 kbps in one carrier, and 9.6 kbps in the second carrier.

Referring back to FIG. 4, based on the number of carriers s currently assigned to the AT, the PerformanceMetric is compared to the next threshold CarrThreshold_(s+1) to determine if more carriers can be efficiently supported by the AT (block 404). In the case where the PerformanceMetric is less than CarrThreshold_1, the AT is simply not able sustain any carriers and communication with the AP will be unsuccessful.

If the PerformanceMetric does not meet or exceed CarrThreshold_(s+1), the PerformanceMetric is compared to the current CarrThreshold_s to determine if the AT can still efficiently support the current number of carriers s assigned to it by the AN (block 406). If the PerformanceMetric is greater than CarrThreshold_s (i.e., CarrThreshold_s<PerformanceMetric≤CarrThreshold_(s+1)), the number of assigned carriers s is already set to the desired number and no further action is needed. If the PerformanceMetric is less than CarrThreshold_s, the number of assigned carriers s can in fact no longer be simultaneously supported by the AT in an efficient manner. Here, a drop signal is triggered to drop one assigned carrier (block 408). In an EV-DO system, for example, the AT is permitted to drop any number of carriers as long as it immediately notifies the AN via a TCA message so that dropped carriers can be reassigned to other ATs as needed. Subsequently, the number of assigned carriers s is decremented to reflect the change in active carrier status (block 410).

Returning to the comparison of the PerformanceMetric and CarrThreshold_(s+1), if the PerformanceMetric meets or exceeds CarrThreshold_(s+1), the AT determines that it can efficiently support another carrier. Here, the AT first checks to make sure that it has not already reached the maximum supportable number of carriers defined by the current communication system (block 412). If it has in fact reached the limit on the number of carriers it can use, no further action is taken.

Otherwise, an add signal is triggered to attempt to add another carrier from the AN (block 314). In an EV-DO system, for example, to add another carrier the AT requests another carrier be assigned to it by the AN via a TCA message. (Generation of TCA messages is detailed in the discussion of the various data and carrier states below.)

The AT then checks to see if its attempt to add another carrier from the AN was successful (block 416). If the addition was not successful, no further action is taken. For example, the AN may not have any available carriers to assign to the AT at a given time, and so the request may be denied by the AN. If the addition was successful, the number of assigned carriers s is incremented to reflect the change in assignment (block 418).

While the determination of whether a carrier is to be dropped can be can be made as described above, the particular carrier selected to be dropped is determined separately. In one embodiment, the particular carrier selected to be dropped is determined according to carrier priorities in a manner similar to carrier deactivation described above with reference to FIG. 3. Returning to the example EV-DO system, carrier priority can again be indicated in the ReverseChannelDroppingRank attribute. A tie among carriers based on the ReverseChannelDroppingRank metric can also be handled according to a second metric tie-breaker (e.g., long-term average transmit pilot power, FRAB, T2PInflow, etc.).

In some embodiments, the decision to add or drop carriers is made in a manner that provides sufficient hysteresis between successive carrier add/drop requests to provide a relatively smooth transition at the AT. In one embodiment, a timer is used with configurable values to regulate the time between successive carrier add/drop requests. One example delay value that can be used is 1 second. Another example is 3 seconds. For example, FIG. 4 illustrates an optional timer delay before commencing further PerformanceMetric evaluations (block 420). In another embodiment, the AT heavily filters the PerformanceMetric over time so that short term transients are smoothed out (as part of block 402). Any of the filtering methods described above with reference to FIG. 3 can be used (e.g., IIR pole filtering, moving window average, etc.).

Data-Active State

A carrier selected for data transmission and placed in the data-active subset is said to be in a data-active state. A carrier in the data-active state can transition to a data-inactive state or carrier-inactive state (both described below) through one or more of the deactivate and drop triggers generated as described above.

Figure 5:
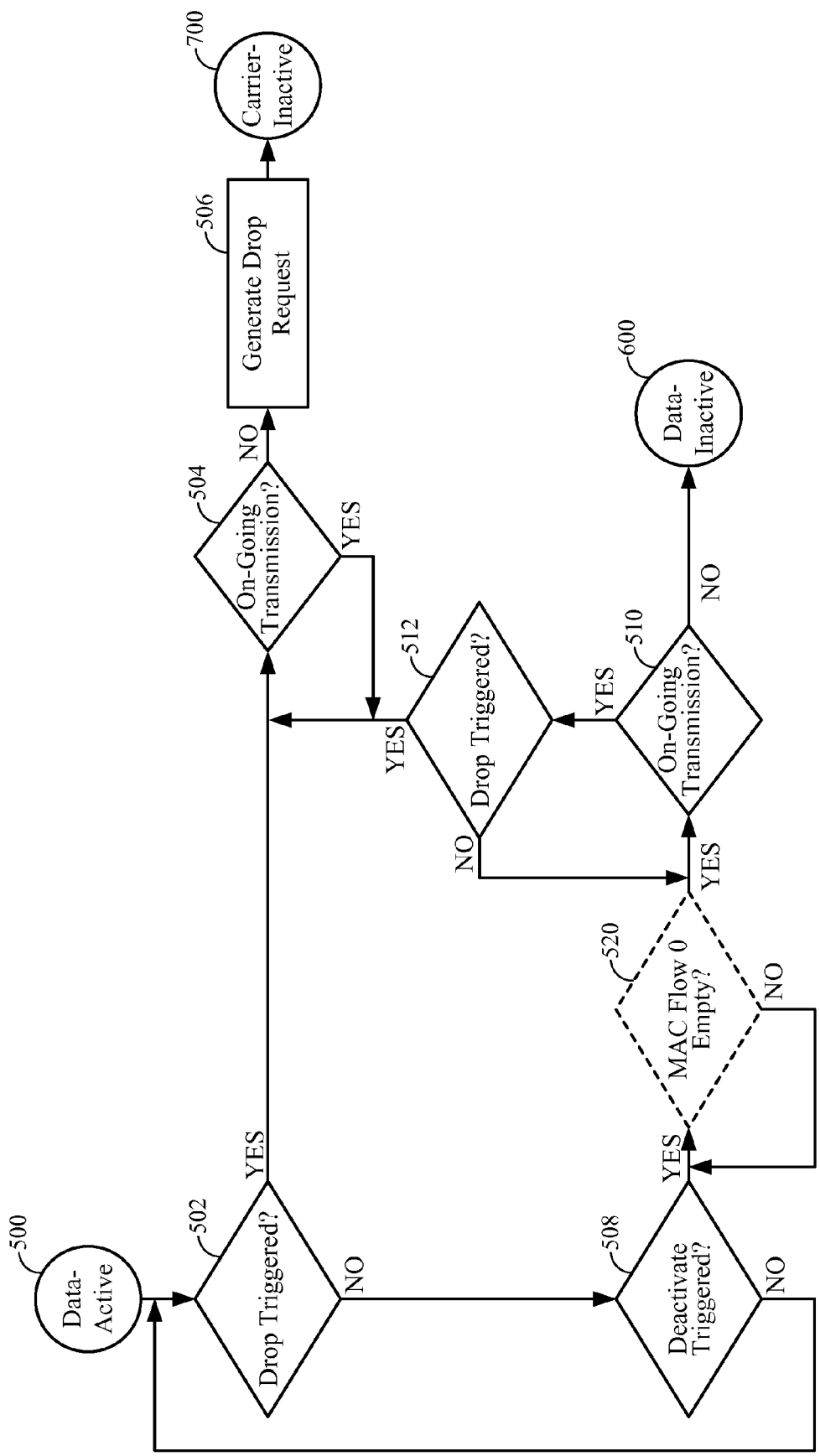
FIG. 5 is a flow diagram that illustrates transitioning a carrier from a data-active state to other states according to an embodiment of the invention.

FIG. 5 is a flow diagram that illustrates transitioning a carrier from a data-active state to other states according to an embodiment of the invention.

In the data-active state 500, the AT checks to see whether a drop has been triggered (block 502). If a drop has been triggered, the AT checks to see whether an ongoing transmission is in progress on the carrier to be dropped (e.g., the lowest priority carrier) (block 504). If an ongoing transmission is in progress, the AT waits for it to finish so as to not interrupt communications with the AP and AN. When the ongoing transmission has completed, or if no transmission on the selected carrier was active, the AT generates a drop request message for the AN (e.g., a TCA message) (block 506) and places the selected carrier into the carrier-inactive state 700 (see FIG. 7).

If no drop has been triggered, the AT checks to see whether a deactivation has been triggered (block 508). If a deactivation has been triggered, the AT checks to see whether an ongoing transmission is in progress on the carrier to be deactivated (e.g., the lowest priority active carrier) (block 510). If an ongoing transmission is in progress, the AT waits for it to finish so as to not interrupt communications with the AP and AN. In the meantime, however, the AT also checks to see whether a drop has been subsequently triggered since beginning to wait for the ongoing transmission to finish (block 512). If a drop has been triggered during the deactivation process, the AT returns to drop processing as described above by waiting for the ongoing transmission to finish (block 504), generating a drop request message for the AN (block 506), and placing the selected carrier into the carrier inactive state 700. Otherwise, when the ongoing transmission has completed, or if no transmission on the selected carrier was active, the AT places the selected carrier into the data-inactive state (see FIG. 6).

For signaling link protocol (SLP) carriers carrying signaling messages, when a deactivation is triggered, the AT further checks the MAC Flow 0 data queue for any signaling messages awaiting transmission (optional block 520). If there is pending information in the MAC Flow 0 data queue, the AT waits until all the SLP data has been transmitted and the SLP queues have been cleared. Subsequently, deactivation proceeds as described above.

If neither a drop nor a deactivation has been triggered, there is no change in carrier status.

Data-Inactive State

A carrier that is maintained at the AT by continuing overhead and pilot channel transmissions with the AP but is not selected for data transmission by being placed in the data-inactive subset is said to be in a data-inactive state. A carrier in the data-inactive state can transition to a data-active state (described above) or carrier-inactive state (described below) through one or more of the activate and drop triggers generated as described above.

Figure 6:
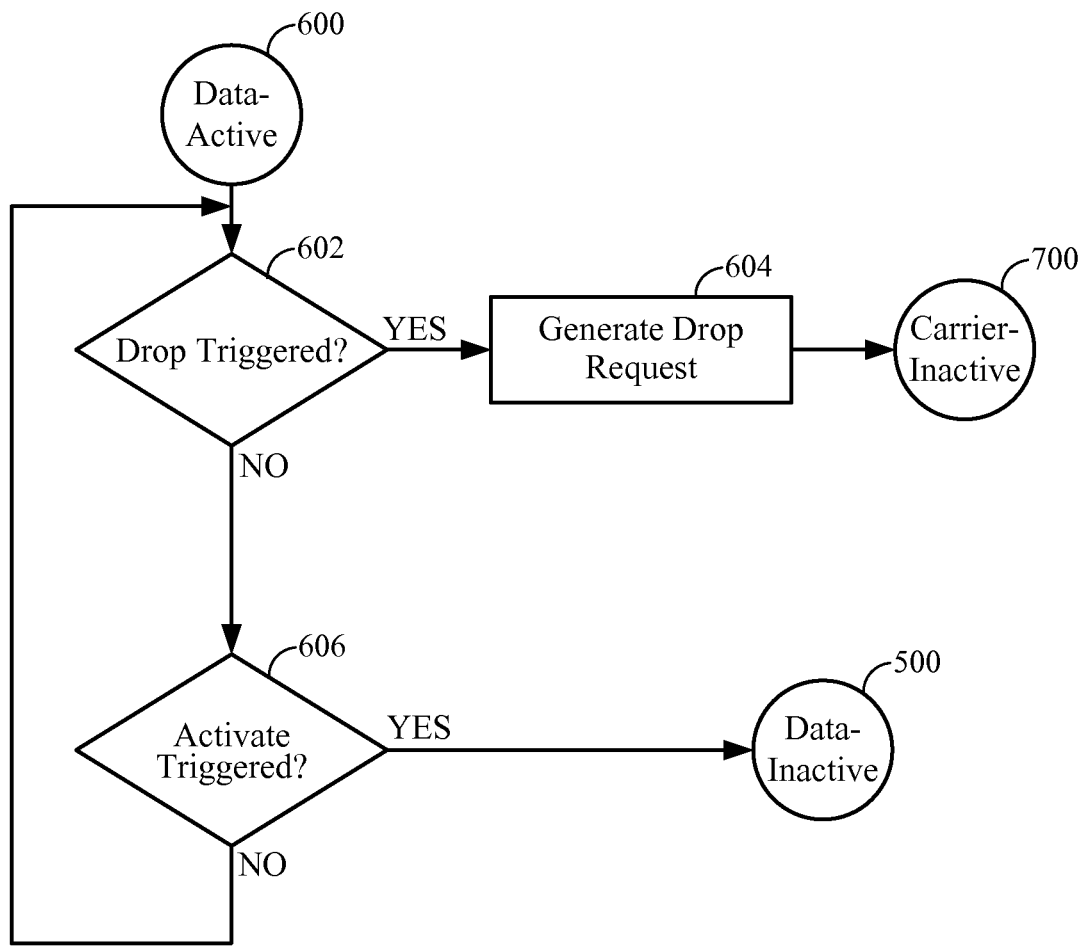
FIG. 6 is a flow diagram that illustrates transitioning a carrier from a data-inactive state to other states according to an embodiment of the invention.

FIG. 6 is a flow diagram that illustrates transitioning a carrier from a data-inactive state to other states according to an embodiment of the invention.

In the data-inactive state 600, the AT checks to see whether a drop has been triggered (block 602). If a drop has been triggered, the AT generates a drop request message for the AN (e.g., a TCA message) (block 604) and places the selected carrier into the carrier-inactive state 700 (see FIG. 7). There is no need to check for ongoing transmission as the selected carrier is from the data-inactive subset of carriers not currently being used for data transmissions.

If no drop has been triggered, the AT checks to see whether an activation has been triggered (block 606). If an activation has been triggered, the AT places the selected carrier into the data-active state (see FIG. 6). The selected carrier can now be used for subsequent data transmission.

If neither a drop nor an activation has been triggered, there is no change in carrier status.

Carrier Inactive State

A carrier that is not currently assigned to the AT by the AN is said to be in a carrier-inactive state. A carrier in the carrier-inactive state can transition to a data-active state (described above) through an add trigger generated as described above and following approval by the AN.

Figure 7:
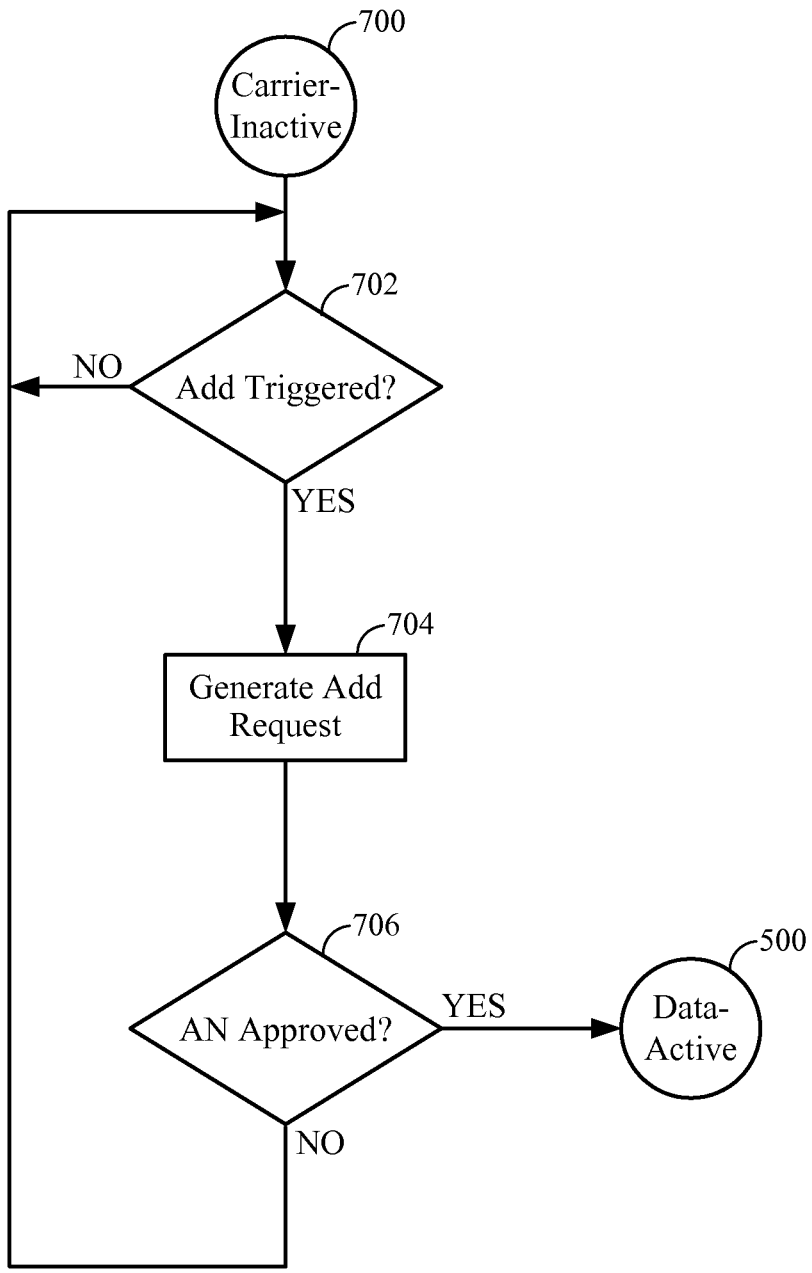
FIG. 7 is a flow diagram that illustrates transitioning a carrier from a carrier-inactive state to the data-active state according to an embodiment of the invention.

FIG. 7 is a flow diagram that illustrates transitioning a carrier from a carrier-inactive state to the data-active state according to an embodiment of the invention.

In the carrier-inactive state 700, the AT checks to see whether an add has been triggered (block 702). If an add has been triggered, the AT generates an add request message for the AN (e.g., a TCA message) (block 704). Otherwise, no action is taken and each inactive carrier remains in the inactive-carrier state.

Once an add request message is sent, the AT waits for a response from the AN (block 706). If the AN approves the request and assigns the AT an additional carrier, that carrier is placed into the data-active state 500 (see FIG. 5). The selected carrier can now be used for subsequent data transmission.

If the add request is not approved by the AN, such as when there are no carriers available to assign to the AT, no carriers are added for the given add trigger.

The designs of FIGS. 6-8 also prevent ongoing new packet transmissions and packet continuation transmissions from being aborted or interrupted. Here, a carrier drop is executed by the AT only after each sub-packet up to the maximum number of allowed sub-packets of a physical layer packet transmission in that carrier have been transmitted. In other embodiments, the AT waits for an ACK message to be received from the AN for that physical layer packet. Furthermore, in the designs of FIGS. 6-8, the AT does not drop a carrier carrying SLP messages over-the-air until all the SLP data has been transmitted and the SLP queues have been cleared. This provides for continuous signaling flow that remains uninterrupted by a carrier add/drop. In one embodiment, when a carrier carrying SLP data has been dropped, the SLP flow is remapped to an existing or a newly added carrier by the AT.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof It will also be appreciated that although several techniques have been presented herein in the context of multicarrier 1xEV-DO-RevB, these techniques can also be applied to other well known multicarrier systems, such as WCDMA and HSUPA, for example.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for carrier management in a wireless communication device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for carrier management in a wireless communication device assigned a set of two or more carriers by a wireless communication network, the method comprising:
   transmitting data over the wireless communication network on one or more carriers forming a subset of active carriers from the set of carriers assigned to the wireless communication device, the subset of active carriers including fewer carriers than the set of carriers assigned to the wireless communication device;
   determining a first performance metric indicative of operating conditions across the set of carriers assigned to the wireless communication device;
   determining a desired number of carriers on which to transmit data based on the first performance metric;
   comparing the desired number of carriers on which to transmit data with the number of carriers in the subset of active carriers;
   dynamically adjusting the subset of active carriers based on the comparison; and
   transmitting subsequent data over the wireless communication network using the adjusted subset of active carriers.

2. The method of claim 1, wherein the first performance metric indicates a long term average interference seen by the wireless communication device over the set of assigned carriers.

3. The method of claim 1, wherein the first performance metric indicates a total amount of data pending transmission at the wireless communication device.

4. The method of claim 1, wherein the first performance metric indicates a total transmit power used for transmitting data over the set of assigned carriers.

5. The method of claim 1, wherein the first performance metric is filtered over time to provide a time averaged-performance metric.

6. The method of claim 1, wherein determining the desired number of carriers on which to transmit data comprises comparing the first performance metric to one or more thresholds indicating a given number of carriers on which to transmit data.

7. The method of claim 6, wherein each threshold is set based on a minimum desired data rate for the corresponding number of carriers.

8. The method of claim 1, wherein dynamically adjusting the subset of active carriers comprises:
   adding one carrier to the subset of active carriers if the desired number of carriers is greater than the number of carriers in the subset of active carriers; and
   removing one carrier from the subset of active carriers if the desired number of carriers is less than the number of carriers in the subset of active carriers.

9. The method of claim 8, wherein the added or removed carrier is selected according to a prioritized listing of the carriers maintained by the wireless communication device.

10. The method of claim 9, wherein removing the selected carrier is postponed until any active data transmissions on the selected carrier have been completed.

11. The method of claim 1, further comprising:
    maintaining overhead transmissions on carriers not used for transmitting data to keep them assigned to the wireless communication device by the wireless communication network.

12. The method of claim 1, further comprising:
    determining a second performance metric indicative of operating conditions across the set of carriers assigned to the wireless communication device;
    determining a desired number of carriers to maintain at the wireless communication device based on the second performance metric;
    comparing the desired number of carriers to maintain with the number of carriers in the set of assigned carriers;
    dynamically generating an add request message for transmission to the wireless communication network if the desired number of carriers to maintain is greater than the number of carriers in the set of assigned carriers; and
    dynamically generating a drop request message for transmission to the wireless communication network if the desired number of carriers to maintain is less than the number of carriers in the set of assigned carriers.

13. The method of claim 12, wherein the second performance metric is the same as the first performance metric.

14. The method of claim 12, wherein the second performance metric is different from the first performance metric.

15. The method of claim 12, wherein determining the desired number of carriers to maintain comprises comparing the second performance metric to one or more thresholds indicating a given number of carriers to maintain.

16. The method of claim 15, wherein each threshold is set based on a minimum desired data rate for the corresponding number of carriers.

17. The method of claim 12, wherein the drop request message requests that the wireless communication network drop a carrier selected according to a prioritized listing of the carriers maintained by the wireless communication device.

18. The method of claim 17, wherein dynamically generating the drop request messages is postponed until any active data transmissions on the selected carrier have been completed.

19. The method of claim 12, wherein dynamically generating the add or drop request messages are spaced apart by at least a minimum amount of time configurable by the wireless communication device.

20. The method of claim 12, wherein the second performance metric is filtered over time to provide a time-averaged performance metric.

21. A wireless communication device for communicating with a wireless communication network over an assigned set of two or more carriers, the wireless communication device comprising:
  logic configured to transmit data over the wireless communication network on one or more carriers forming a subset of active carriers from the set of carriers assigned to the wireless communication device, the subset of active carriers including fewer carriers than the set of carriers assigned to the wireless communication device;
  logic configured to determine a first performance metric indicative of operating conditions across the set of carriers assigned to the wireless communication device;
  logic configured to determine a desired number of carriers on which to transmit data based on the first performance metric;
  logic configured to compare the desired number of carriers on which to transmit data with the number of carriers in the subset of active carriers;
  logic configured to dynamically adjust the subset of active carriers based on the comparison; and
  logic configured to transmit subsequent data over the wireless communication network using the adjusted subset of active carriers.

22. The wireless communication device of claim 21, wherein the first performance metric indicates a long term average interference seen by the wireless communication device over the set of assigned carriers.

23. The wireless communication device of claim 21, wherein the first performance metric indicates a total amount of data pending transmission at the wireless communication device.

24. The wireless communication device of claim 21, wherein the first performance metric indicates a total transmit power used for transmitting data over the set of assigned carriers.

25. The wireless communication device of claim 21, wherein the first performance metric is filtered over time to provide a time averaged-performance metric.

26. The wireless communication device of claim 21, wherein the logic configured to determine the desired number of carriers on which to transmit data comprises logic configured to compare the first performance metric to one or more thresholds indicating a given number of carriers on which to transmit data.

27. The wireless communication device of claim 26, wherein each threshold is set based on a minimum desired data rate for the corresponding number of carriers.

28. The wireless communication device of claim 21, wherein the logic configured to dynamically adjust the subset of active carriers comprises:
  logic configured to add one carrier to the subset of active carriers if the desired number of carriers is greater than the number of carriers in the subset of active carriers; and
  logic configured to remove one carrier from the subset of active carriers if the desired number of carriers is less than the number of carriers in the subset of active carriers.

29. The wireless communication device of claim 28, wherein the added or removed carrier is selected according to a prioritized listing of the carriers maintained by the wireless communication device.

30. The wireless communication device of claim 29, wherein removing the selected carrier is postponed until any active data transmissions on the selected carrier have been completed.

31. The wireless communication device of claim 21, further comprising:
  logic configured to maintain overhead transmissions on carriers not used for transmitting data to keep them assigned to the wireless communication device by the wireless communication network.

32. The wireless communication device of claim 21, further comprising:
  logic configured to determine a second performance metric indicative of operating conditions across the set of carriers assigned to the wireless communication device;
  logic configured to determine a desired number of carriers to maintain at the wireless communication device based on the second performance metric;
  logic configured to compare the desired number of carriers to maintain with the number of carriers in the set of assigned carriers;
  logic configured to dynamically generate an add request message for transmission to the wireless communication network if the desired number of carriers to maintain is greater than the number of carriers in the set of assigned carriers; and
  logic configured to dynamically generate a drop request message for transmission to the wireless communication network if the desired number of carriers to maintain is less than the number of carriers in the set of assigned carriers.

33. The wireless communication device of claim 32, wherein the second performance metric is the same as the first performance metric.

34. The wireless communication device of claim 32, wherein the second performance metric is different from the first performance metric.

35. The wireless communication device of claim 32, wherein the logic configured to determine the desired number of carriers to maintain comprises logic configured to compare the second performance metric to one or more thresholds indicating a given number of carriers to maintain.

36. The wireless communication device of claim 35, wherein each threshold is set based on a minimum desired data rate for the corresponding number of carriers.

37. The wireless communication device of claim 32, wherein the drop request message requests that the wireless communication network drop a carrier selected according to a prioritized listing of the carriers maintained by the wireless communication device.

38. The wireless communication device of claim 37, wherein dynamically generating the drop request messages is postponed until any active data transmissions on the selected carrier have been completed.

39. The wireless communication device of claim 32, wherein dynamically generating the add or drop request messages are spaced apart by at least a minimum amount of time configurable by the wireless communication device.

40. The wireless communication device of claim 32, wherein the second performance metric is filtered over time to provide a time-averaged performance metric.

41. A wireless communication device for communicating with a wireless communication network over an assigned set of two or more carriers, the wireless communication device comprising:
  means for transmitting data over the wireless communication network on one or more carriers forming a subset of active carriers from the set of carriers assigned to the wireless communication device, the subset of active carriers including fewer carriers than the set of carriers assigned to the wireless communication device;

means for determining a first performance metric indicative of operating conditions across the set of carriers assigned to the wireless communication device;

means for determining a desired number of carriers on which to transmit data based on the first performance metric;

means for comparing the desired number of carriers on which to transmit data with the number of carriers in the subset of active carriers;

means for dynamically adjusting the subset of active carriers based on the comparison; and means for transmitting subsequent data over the wireless communication network using the adjusted subset of active carriers.

42. The wireless communication device of claim 41, wherein the first performance metric indicates a long term average interference seen by the wireless communication device over the set of assigned carriers.

43. The wireless communication device of claim 41, wherein the first performance metric indicates a total amount of data pending transmission at the wireless communication device.

44. The wireless communication device of claim 41, wherein the first performance metric indicates a total transmit power used for transmitting data over the set of assigned carriers.

45. The wireless communication device of claim 41, wherein the first performance metric is filtered over time to provide a time averaged-performance metric.

46. The wireless communication device of claim 41, wherein the means for determining the desired number of carriers on which to transmit data comprises logic configured to compare the first performance metric to one or more thresholds indicating a given number of carriers on which to transmit data.

47. The wireless communication device of claim 46, wherein each threshold is set based on a minimum desired data rate for the corresponding number of carriers.

48. The wireless communication device of claim 41, wherein the means for dynamically adjusting the subset of active carriers comprises:

means for adding one carrier to the subset of active carriers if the desired number of carriers is greater than the number of carriers in the subset of active carriers; and means for removing one carrier from the subset of active carriers if the desired number of carriers is less than the number of carriers in the subset of active carriers.

49. The wireless communication device of claim 48, wherein the added or removed carrier is selected according to a prioritized listing of the carriers maintained by the wireless communication device.

50. The wireless communication device of claim 49, wherein removing the selected carrier is postponed until any active data transmissions on the selected carrier have been completed.

51. The wireless communication device of claim 41, further comprising:

means for maintaining overhead transmissions on carriers not used for transmitting data to keep them assigned to the wireless communication device by the wireless communication network.

52. The wireless communication device of claim 41, further comprising:

means for determining a second performance metric indicative of operating conditions across the set of carriers assigned to the wireless communication device;

means for determining a desired number of carriers to maintain at the wireless communication device based on the second performance metric;

means for comparing the desired number of carriers to maintain with the number of carriers in the set of assigned carriers;

means for dynamically generating an add request message for transmission to the wireless communication network if the desired number of carriers to maintain is greater than the number of carriers in the set of assigned carriers; and means for dynamically generating a drop request message for transmission to the wireless communication network if the desired number of carriers to maintain is less than the number of carriers in the set of assigned carriers.

53. The wireless communication device of claim 52, wherein the second performance metric is the same as the first performance metric.

54. The wireless communication device of claim 52, wherein the second performance metric is different from the first performance metric.

55. The wireless communication device of claim 52, wherein the means for determining the desired number of carriers to maintain comprises means for comparing the second performance metric to one or more thresholds indicating a given number of carriers to maintain.

56. The wireless communication device of claim 55, wherein each threshold is set based on a minimum desired data rate for the corresponding number of carriers.

57. The wireless communication device of claim 52, wherein the drop request message requests that the wireless communication network drop a carrier selected according to a prioritized listing of the carriers maintained by the wireless communication device.

58. The wireless communication device of claim 57, wherein dynamically generating the drop request messages is postponed until any active data transmissions on the selected carrier have been completed.

59. The wireless communication device of claim 52, wherein dynamically generating the add or drop request messages are spaced apart by at least a minimum amount of time configurable by the wireless communication device.

60. The wireless communication device of claim 52, wherein the second performance metric is filtered over time to provide a time-averaged performance metric.

61. A non-transitory computer readable medium comprising code, which, when executed by a processor, causes the processor to perform operations for carrier management in a wireless communication device assigned a set of two or more carriers by a wireless communication network, the computer readable medium comprising:

code for transmitting data over the wireless communication network on one or more carriers forming a subset of active carriers from the set of carriers assigned to the wireless communication device, the subset of active carriers including fewer carriers than the set of carriers assigned to the wireless communication device;

code for determining a first performance metric indicative of operating conditions across the set of carriers assigned to the wireless communication device;

code for determining a desired number of carriers on which to transmit data based on the first performance metric;

code for comparing the desired number of carriers on which to transmit data with the number of carriers in the subset of active carriers;

code for dynamically adjusting the subset of active carriers based on the comparison; and code for transmitting subsequent data over the wireless communication network using the adjusted subset of active carriers.

62. The computer readable medium of claim 61, wherein the first performance metric indicates a long term average interference seen by the wireless communication device over the set of assigned carriers.

63. The computer readable medium of claim 61, wherein the first performance metric indicates a total amount of data pending transmission at the wireless communication device.

64. The computer readable medium of claim 61, wherein the first performance metric indicates a total transmit power used for transmitting data over the set of assigned carriers.

65. he computer readable medium of claim 61, wherein the first performance metric is filtered over time to provide a time averaged-performance metric.

66. The computer readable medium of claim 61, wherein the code for determining the desired number of carriers on which to transmit data comprises logic configured to compare the first performance metric to one or more thresholds indicating a given number of carriers on which to transmit data.

67. The computer readable medium of claim 66, wherein each threshold is set based on a minimum desired data rate for the corresponding number of carriers.

68. The computer readable medium of claim 61, wherein the code for dynamically adjusting the subset of active carriers comprises:
- code for adding one carrier to the subset of active carriers if the desired number of carriers is greater than the number of carriers in the subset of active carriers; and
- code for removing one carrier from the subset of active carriers if the desired number of carriers is less than the number of carriers in the subset of active carriers.

69. The computer readable medium of claim 68, wherein the added or removed carrier is selected according to a prioritized listing of the carriers maintained by the wireless communication device.

70. The computer readable medium of claim 69, wherein removing the selected carrier is postponed until any active data transmissions on the selected carrier have been completed.

71. The computer readable medium of claim 61, further comprising:
- code for maintaining overhead transmissions on carriers not used for transmitting data to keep them assigned to the wireless communication device by the wireless communication network.

72. The computer readable medium of claim 61, further comprising:
- code for determining a second performance metric indicative of operating conditions across the set of carriers assigned to the wireless communication device;
- code for determining a desired number of carriers to maintain at the wireless communication device based on the second performance metric;
- code for comparing the desired number of carriers to maintain with the number of carriers in the set of assigned carriers;
- code for dynamically generating an add request message for transmission to the wireless communication network if the desired number of carriers to maintain is greater than the number of carriers in the set of assigned carriers; and
- code for dynamically generating a drop request message for transmission to the wireless communication network if the desired number of carriers to maintain is less than the number of carriers in the set of assigned carriers.

73. The computer readable medium of claim 72, wherein the second performance metric is the same as the first performance metric.

74. The computer readable medium of claim 72, wherein the second performance metric is different from the first performance metric.

75. The computer readable medium of claim 72, wherein the code for determining the desired number of carriers to maintain comprises code for comparing the second performance metric to one or more thresholds indicating a given number of carriers to maintain.

76. The computer readable medium of claim 75, wherein each threshold is set based on a minimum desired data rate for the corresponding number of carriers.

77. The computer readable medium of claim 72, wherein the drop request message requests that the wireless communication network drop a carrier selected according to a prioritized listing of the carriers maintained by the wireless communication device.

78. The computer readable medium of claim 77, wherein dynamically generating the drop request messages is postponed until any active data transmissions on the selected carrier have been completed.

79. The computer readable medium of claim 72, wherein dynamically generating the add or drop request messages are spaced apart by at least a minimum amount of time configurable by the wireless communication device.

80. The computer readable medium of claim 72, wherein the second performance metric is filtered over time to provide a time-averaged performance metric.

* * * * *